(12) United States Patent
Yoshii et al.

(10) Patent No.: US 6,617,448 B2
(45) Date of Patent: Sep. 9, 2003

(54) PROCESS FOR PRODUCING GROSSLINKED STARCH DERIVATIVES AND CROSSLINKED STARCH DERIVATIVES PRODUCED BY THE SAME

(75) Inventors: Fumio Yoshii, Gunma (JP); Tamikazu Kume, Gunma (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 09/861,666

(22) Filed: May 22, 2001

(65) Prior Publication Data

US 2002/0010327 A1 Jan. 24, 2002

(30) Foreign Application Priority Data

May 24, 2000 (JP) ........................................ 2000-152372

(51) Int. Cl.[7] ............................................... C08B 31/00
(52) U.S. Cl. .................... 536/106; 536/1.11; 536/123.1
(58) Field of Search ............................... 536/1.11, 124, 536/111, 106, 123.1

(56) References Cited

FOREIGN PATENT DOCUMENTS

JP 61-60784 * 3/1986 ........... C10B/57/08

OTHER PUBLICATIONS

Frederick C. Leavitt "Crosslinking of Cellulosics By High Energy Radiation. II", Journal Of Polymer Science, 1961, vol. 51, pp. 439–357.*
10 08 "Radiation Processing of Biodegradable Polymer (2) Hydrogel from Cellulose Derivatives", Radislow A. Wach et al., 1999, pp. 7–8.*

* cited by examiner

Primary Examiner—James O. Wilson
Assistant Examiner—Ganapathy Krishnan
(74) Attorney, Agent, or Firm—Banner & Witcoff, Ltd.

(57) ABSTRACT

A paste of starch derivative is crosslinked by irradiation with γ-rays or electron beams in a dose of 0.1–200 kGy. Two different levels of crosslinking are performed; the first is mild crosslinking by irradiation at a low dose of 0.1–1.0 kGy to such an extent that the viscosity of the overall system increases upon immersion in water, and the second is intensive crosslinking by irradiation at a higher dose than 1.0 kGy to produce a gel that is completely insoluble in water.

10 Claims, No Drawings

PROCESS FOR PRODUCING CROSSLINKED STARCH DERIVATIVES AND CROSSLINKED STARCH DERIVATIVES PRODUCED BY THE SAME

BACKGROUND OF THE INVENTION

Petroleum-based high molecular materials are commonly used in films and containers but disposal of their wastes is becoming increasingly difficult. Incineration has the potential to produce deadly dioxicins. Since the wastes of synthetic polymers are not degradable, they will remain for long periods in the soil in which they are buried. Starches such as corn starch are produced in plants, so they are nondepletable resources and used in various processed foods. Starches are also used as biodegradable materials in small quantities. After use, waste starches are rapidly degraded by soil microorganisms to become part of the soil. Hence, starches are adapted to cycles of nature. However, starches are degraded by irradiation and have been held impossible to modify by irradiation.

According to the invention, a mixture of a starch derivative and water is adequately kneaded to the consistency of paste (glue) and exposed to an ionizing radiation, whereupon it is crosslinked to become insoluble in water. The crosslinked product still maintains biodegradability. Hence, the crosslinked starch derivatives of the invention are anticipated to find many applications as environmentally acceptable materials that can substitute for hydrogels and petroleum-based plastics.

Carboxymethyl starch (CMS) and its salts are useful as thickeners and coatings. These materials can be crosslinked with crosslinkers even if they are not exposed to radiations. Commonly used crosslinkers are various aldehydes and epichlorohydrins. A problem with the use of crosslinkers is that some part of them always remain unreacted in the product. Since these reagents are toxic enough to contaminate the working environment, they must be handled carefully in closed spaces.

Water-soluble polymers are generally subjected to crosslinking or graft polymerization before they are used as superabsorbent gel. Polyacrylic acids are used as absorbent in paper diapers and sanitary products. However, polyacrylic acids are not degradable with microorganisms and may cause a problem if simply disposed. It is well known that CMS is readily degradable with microorganisms in soil. However, if CMS alone is exposed to radiation either in a solid form or as a dilute solution, decomposition predominates over crosslinking. It is therefore desired to develop a simple, environment friendly crosslinking method.

SUMMARY OF THE INVENTION

An object of the invention is to provide a method for safe and cost-effective crosslinking of starch derivatives from the rhizomes, grains and stems of plants as natural resources.

Another object of the invention is to provide crosslinked starch derivatives that can be used as superabsorbent and in many other applications.

The present inventors conducted intensive studies on the degradation and crosslinking of water-soluble polymers by exposure to radiation and found that starch derivatives, if kneaded intimately with water to the consistency of paste, could be easily crosslinked by irradiation. The present invention has been accomplished on the basis of this finding.

In accordance with the invention, a paste of starch derivative is crosslinked by irradiation with γ-rays or electron beams in a dose of 0.1–200 kGy. Two different levels of crosslinking are intended by the invention; the first is mild crosslinking by irradiation at a low dose of 0.1–1.0 kGy to such an extent that the viscosity of the overall system increases upon immersion in water, and the second is intensive crosslinking by irradiation at a higher dose than 1.0 kGy to produce a gel that is completely insoluble in water. Depending on the intended use, a suitable exposure dose is chosen to control the degree of crosslinking.

DETAILED DESCRIPTION OF THE INVENTION

In the present invention, starch derivatives as a plant-base natural resource are kneaded with water to give the consistency of paste and then crosslinked by irradiation. The starch derivatives as used in the invention are chosen from corn starch, potato starch, sweet potato starch, wheat starch, rice starch, tapioca starch and sago starch and exemplified by carboxymethyl starch, carboxyethyl starch, methyl starch, ethyl starch, hydroxyethyl starch, hydroxypropyl starch, oxidized starch, acetyl starch, aminoalkyl starch and allyl starch.

The sources of irradiation that can be used in the invention are cobalt 60 and an electron beam accelerator. Irradiation with γ-rays from cobalt 60 can be performed by various known methods. Electron beam accelerators are preferably of medium- and high-energy types but a low-energy electron beam accelerator may of course be employed.

The dose of irradiation is in the range of 0.1–200 kGy. In the present invention, crosslinking is adjusted to occur in one of two ways. By low-dose irradiation (0.1–1.0 kGy), crosslinking occurs to increase only viscosity. By higher-dose irradiation (>1.0 kGy), crosslinking occurs to produce a water-insoluble gel having a network structure. The dose for crosslinking varies with the degree of substitution and the higher the degree of substitution, the lower the dose that is required to give the same degree of crosslinking (the same gel fraction). The crosslinking rate increases with the increasing temperature of irradiation but for the ease of irradiation, room temperature is preferred. The crosslinking reaction slows down at low temperature.

The starch derivatives have molecular weights on the order of $10^4$–$10^6$ but are not limited to any particular values. The radiation-induced crosslinking depends on molecular weight and the larger the molecular weight, the lower the dose that is required to give a predetermined degree of crosslinking.

The concentration of starch derivatives to be crosslinked by irradiation depends on their affinity for water. The higher the degree of substitution, the more affinitive the starch derivatives are for water and, hence, the higher their solubility in water. The starch derivatives are preferably irradiated in the form of a highly concentrated, semisolid paste (grease). In a solid form having no water or in an aqueous solution no more concentrated than 5%, the starch derivatives are not crosslinked but are decomposed progressively upon irradiation. In the best case, the starch derivatives are well kneaded with water to form a paste uniformly impregnated with water at a concentration of 20% or more and the paste is then exposed to radiation. To give guide figures, CMS whose degree of substitution is 0.01–3.0 is crosslinked with greatest ease at concentrations of 50–60%.

As crosslinking proceeds, a network structure forms to eventually yield a water-insoluble gel. To determine the gel fraction, the irradiated CMS is sampled in a given amount, immersed in a large amount of deionized water for 48 hours, filtered through a 20-mesh stainless steel screen, and the insoluble (gel) content is recovered and its weight is substituted into the following equation:

Gel fraction (%)=(W2/W1)×100 where W1 is the dry weight of the starting CMS and W2 is the dry weight of the insoluble content retained on the stainless steel screen.

EXAMPLE 1

CMS powders whose degree of substitution was 0.15 were intimately mixed with water to give concentrations of 2, 5, 10, 20, 40, 50, 60 and 70%. The solutions were exposed to 50 kGy of electron beams and the resulting gel fractions are shown in Table 1, in which 100% for CMS concentration refers to the water-free CMS powder. Obviously, the 2, 5, 10% aqueous solutions and the CMS powder had such low viscosity that degradation predominated over gel formation and no gel fraction was observed. Only when CMS was mixed with water in 20% or higher concentrations to give the consistency of grease-like paste, irradiation caused crosslinking of CMS to produce a water-insoluble gel. For most efficient irradiation, CMS preferably has concentrations of 50–60%.

TABLE 1

Gel Fractions in CMS at Varying Concentrations Upon Exposure to 50 kGy of Electron Beams

| CMS concentration, % | 2 | 5 | 10 | 20 | 40 | 50 | 60 | 70 | 100 |
|---|---|---|---|---|---|---|---|---|---|
| Gel fraction, % | 0 | 0 | 0 | 55.7 | 68.7 | 70.4 | 72.7 | 45.1 | 0 |

EXAMPLE 2

Pastes of 40% CMS were irradiated at varying doses and the resulting gel fractions are shown in Table 2. The minimum dose required to accomplish effective crosslinking was only a fifth of the dose (25 kGy) commonly used to sterilize medical tools such as syringes and artificial dialyzers. When immersed in water, crosslinked CMS absorbs water to form a hydrogel. The water absorption depends on the dose of irradiation and when irradiated at 5 kGy, one gram of CMS can hold 153 g of water.

TABLE 2

Gel Fractions and Ultimate Swells upon Exposure of 40% CMS Pastes to Electron Beams

| Dose, kGy | 5 | 10 | 20 | 40 | 80 |
|---|---|---|---|---|---|
| Gel fraction, % | 69.5 | 71.7 | 70.5 | 70.7 | 82.2 |
| Swell, g | 153 | 129 | 103 | 82 | 61 |

EXAMPLE 3

The crosslinked CMS was evaluated for its biodegradability in the following manner. First, 4 g of CMS and 6 g of water were intimately kneaded to form a paste, which was rolled on a Mylar film to form a sheet about 0.5 mm thick. The CMS sheet was exposed to 40 kGy of electron beams and dried. Leaf mold (25%) was intimately mixed with the soil in the premises of the Research Laboratory of Japan Atomic Energy Research Institute; the dried CMS gel shaped to a length of 10 cm, a width of 3 cm and a thickness of 0.5 mm was buried in the soil mixture to a depth of ca. 3 cm from the surface and after 10 days, the CMS was examined for degradability. The crosslinked CMS had disappeared without remaining in the soil. It was therefore clear that CMS was still biodegradable even after being crosslinked.

CMS has heretofore been considered to be difficult to crosslink by exposure to radiation. According to the present invention, this CMS is mixed with a small amount of water and the mixture as kneaded to the consistency of paste is irradiated to initiate the crosslinking reaction. Since CMS is biodegradable, wastes of its use can be disposed of without impacts on the environment and can be part of the soil. Therefore, the crosslinked starch derivatives of the invention are environment friendly and hold promise for use in packaging materials, cosmetics, absorbents, foamed products and soil conditioning materials.

What is claimed is:

1. A process for producing biodegradable crosslinked starch derivatives by irradiating a pasty mixture of 100 parts by weight of a starch derivative and 3–1,000 parts by weight of water, wherein the starch derivative is selected from the group consisting of carboxyl starch, hydroxyl starch, alkyl starch, and mixtures thereof, which have at least one hydroxyl or carboxyl group per glucose unit.

2. The process according to claim 1, wherein a total of at least 20 hydroxyl or carboxyl groups in the starch derivative are in the form of an alkali metal salt, an ammonium salt or an amine salt.

3. The process according to claim 1, wherein the starch derivative has an average degree of substitution of at least 0.01.

4. The process according to claim 1, wherein the radiation is an ionizing radiation and the dose of its exposure is at least 0.1 kGy.

5. The process according to claim 1, wherein the viscosity of the biodegradable crosslinked starch derivative is greater than the viscosity of the starch derivative before irradiation.

6. The process according to claim 1, wherein the viscosity of the starch derivative before irradiation is 1.0 and the viscosity of the biodegradable crosslinked starch derivative is in excess of 1.0 after irradiation.

7. The process according to claim 1, wherein the biodegradable crosslinked starch derivative forms a gel.

8. A crosslinked starch derivative produced by the process according to any one of claims 1, 2, 3, 4, 5, 6, or 7.

9. The crosslinked starch derivative according to claim 8, which can absorb deionized water in an amount at least 5 times as heavy as its own weight.

10. The crosslinked starch derivative according to claim 8, which is in the form of a cylindrical gel having a crushing strength of at least 50 g/cm$^2$.

* * * * *

UNITED STATES PATENT AND TRADEMARK OFFICE
CERTIFICATE OF CORRECTION

PATENT NO. : 6,617,448 B2
DATED : September 9, 2003
INVENTOR(S) : Fumio Yoshii et al.

It is certified that error appears in the above-identified patent and that said Letters Patent is hereby corrected as shown below:

<u>Title page,</u>
Item [54], Title, "GROSSLINKED" has been replaced with -- CROSSLINKED --;
Item [*] Notice, "0" has been replaced with -- 18 --.

Signed and Sealed this

Third Day of February, 2004

JON W. DUDAS
*Acting Director of the United States Patent and Trademark Office*